US012684258B2

(12) United States Patent (10) Patent No.: US 12,684,258 B2
Yoshida (45) Date of Patent: Jul. 14, 2026

(54) IMAGE CAPTURING APPARATUS, IMAGE CAPTURING SYSTEM, AND EQUIPMENT

(71) Applicant: CANON KABUSHIKI KAISHA, Tokyo (JP)

(72) Inventor: Takayuki Yoshida, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 213 days.

(21) Appl. No.: 18/581,648

(22) Filed: Feb. 20, 2024

(65) Prior Publication Data

US 2024/0284060 A1 Aug. 22, 2024

(30) Foreign Application Priority Data

| Feb. 21, 2023 | (JP) | ................................. 2023-025531 |
| Dec. 1, 2023 | (JP) | ................................. 2023-204131 |

(51) Int. Cl.
    *H04N 25/47* (2023.01)
    *H04N 25/78* (2023.01)
(52) U.S. Cl.
    CPC ............. *H04N 25/47* (2023.01); *H04N 25/78* (2023.01)
(58) Field of Classification Search
    None
    See application file for complete search history.

(56) References Cited

U.S. PATENT DOCUMENTS

| 11,631,246 B2 | 4/2023 | Laveau et al. | |
| 2020/0312899 A1* | 10/2020 | Seo | ........................ H04N 25/77 |

| 2020/0326414 A1* | 10/2020 | Delic | .................... G01S 17/894 |
| 2021/0310861 A1* | 10/2021 | Matolin | ............... H04N 25/707 |
| 2024/0015412 A1 | 1/2024 | Tsuchimoto et al. | |

FOREIGN PATENT DOCUMENTS

| JP | 2020-088676 A | 6/2020 |
| JP | 2021-508975 A | 3/2021 |
| JP | 2021-197710 A | 12/2021 |
| JP | 2022-182468 A | 12/2022 |
| WO | 2019/129790 A1 | 7/2019 |

OTHER PUBLICATIONS

A 1280 x 720 Back-Illuminated Stacked Temporal Contrast Event-based Vision Sensor with 4.86μm Pixels, 1.066GEPS Readout, Programmable Event Rate Controller and Compressive Data Formatting Pipeline,2020 IEEE International Solid-State Circuits Conference (ISSCC2020).

* cited by examiner

*Primary Examiner* — Mark T Monk
(74) *Attorney, Agent, or Firm* — Venable LLP

(57) ABSTRACT

An image capturing apparatus comprises a pixel region having a plurality of pixels configured to generate and output event signals upon detecting a variation in quantity of incident light and a readout circuit configured to read out the event signals output from the pixel region. The readout circuit counts the number of the event signals read out from the pixel region, and when the number of the counted event signals exceeds a preset threshold within a predetermined period, the readout circuit discards the event signals read out from the pixel region, and transmits an acknowledge signal to the pixel region.

17 Claims, 16 Drawing Sheets

FIG. 7

EVENT SIGNAL READOUT CIRCUIT 103

ARBITER 400

ADDRESSING UNIT 402

EVENT COUNTER 401

E'

E

A

Rst

Req
Ack
E

Req
Ack
E

...

Req
Ack
E

FIG. 11

F I G. 13
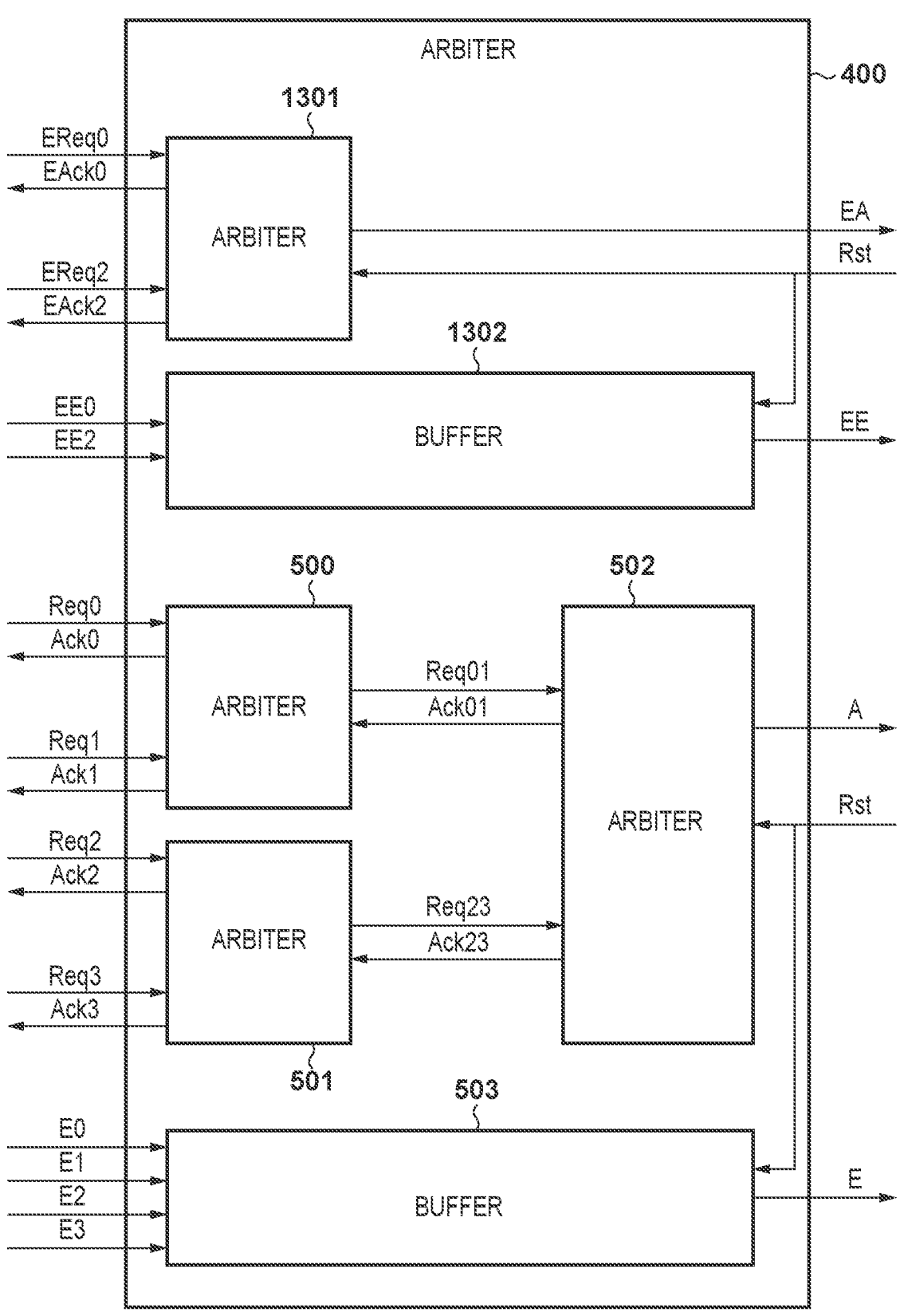

FIG. 14

F I G.  15
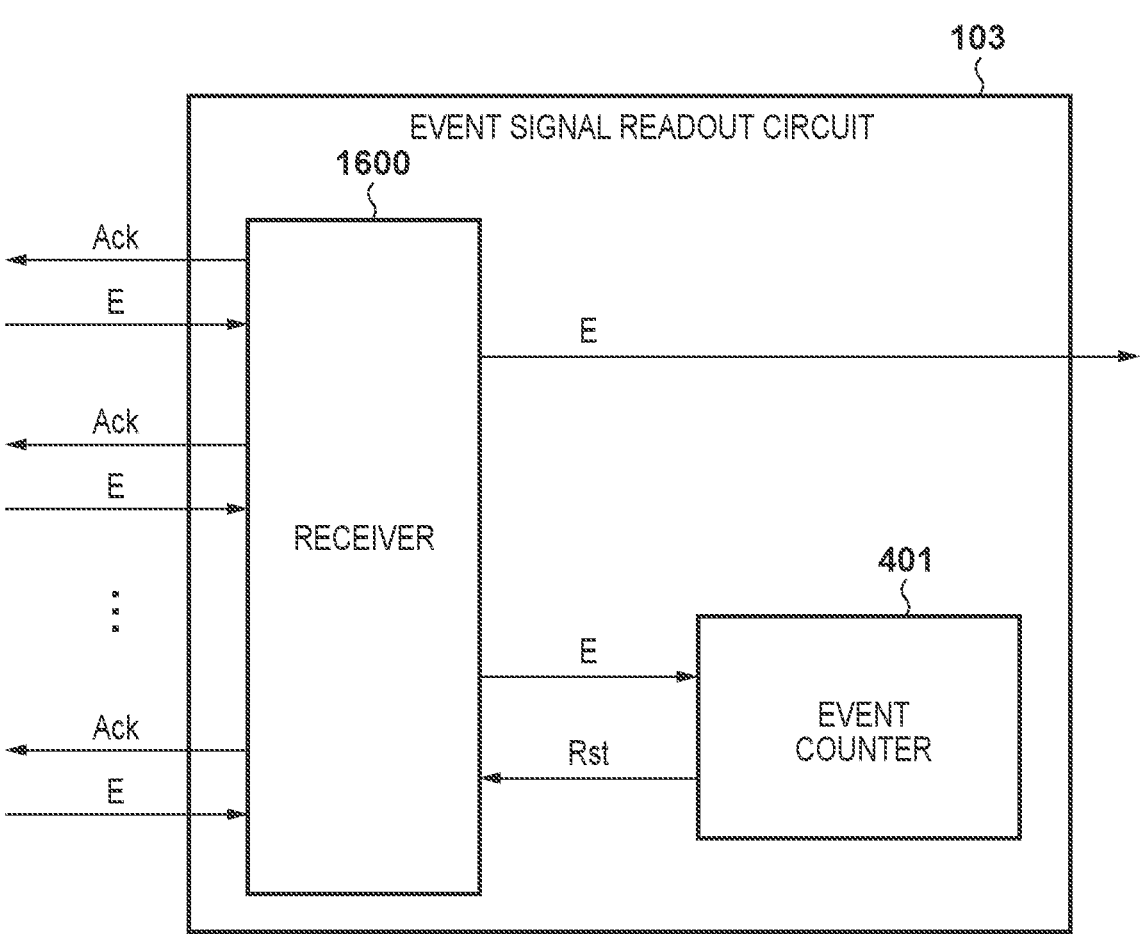

IMAGE CAPTURING APPARATUS, IMAGE CAPTURING SYSTEM, AND EQUIPMENT

BACKGROUND OF THE INVENTION

Field of the Invention

One disclosed aspect of the embodiments relates to an image capturing apparatus, an image capturing system, and equipment using the image capturing apparatus.

Description of the Related Art

Demands have arisen for image sensors lower in power consumption and higher in speed than before along with the popularization of Internet of things (IoT), Artificial Intelligence (AI), and autonomous driving. One of these image sensors is an event-based image capturing apparatus (to be referred to as an event-based sensor, a dynamic vision sensor, or the like). This image capturing apparatus monitors a light amount variation with each pixel arranged on a two-dimensional pixel array and generates and outputs an event signal upon detection of a variation. An event signal is asynchronously generated upon occurrence of a light amount variation and hence enables reduction of the power consumption of an image capturing apparatus and increase the operation speed.

Mounting such an event-based image capturing apparatus or an image capturing apparatus called a dynamic vision system on an autonomous moving object such as a drone makes it possible to detect an obstacle or generate a map (Simultaneous localization and Mapping (SLAM)). This image capturing apparatus can also be used as in-vehicle equipment to, for example, detect pedestrians and other vehicles.

Japanese Patent Laid-Open No. 2021-508975 (hereinafter PTL 1) discloses a technique of filtering a generated signal to cope with an overflow on the downstream side of a processing flow for an event signal when the generation rate of the event signal exceeds a threshold. According to "A 1280×720 Back-Illuminated Stacked Temporal Contrast Event-based Vision Sensor with 4.86 μm Pixels, 1.066GEPS Readout, Programmable Event Rate Controller and Compressive Data Formatting Pipeline", 2020 IEEE International Solid-State Circuits Conference (ISSCC2020) (hereinafter NPL 1), the detection circuit of each pixel issues a request signal Req for requesting the reception of an event to the arbiter upon detecting an event, and the arbiter selects a row to read out. Since a signal associated with an event which can be read out row by row, if the request signals Req are issued from two or more rows, the arbiter sets some row in a readout waiting state. In addition, since a readout operation is sequentially performed for each pixel, it takes some time to complete the readout of all the pixels that have detected events.

For example, the number of rows of pixels arranged in the sensor is 720. When light amount variations are detected in all the rows of the sensor, it takes a time corresponding to 720 rows at maximum to read out event signals due to waiting for readout from the pixels.

If it takes 1.2 us to read out one row, it takes little less than 1 ms to read out all the rows. Even if the time resolution of time stamps added to event signals is as high as 1 μs, the time waited for readout can be a time stamp error. In addition, a time stamp error can cause an artifact like that makes, for example, a straight line in reality be observed as a curve. Furthermore, if the next event has occurred in the same pixel by the time the request signal Req is issued and read out, information may be lost.

The present invention has been made in consideration of the above problem and can provide a technique advantageous in reducing the delay time until an event is detected as an event even with the occurrence of many events in an image capturing apparatus that detects a variation in the quantity of incident light.

SUMMARY OF THE INVENTION

According to one aspect of the disclosure, there is provided an image capturing apparatus comprising a pixel region having a plurality of pixels configured to generate and output event signals upon detecting a variation in quantity of incident light and a readout circuit configured to read out the event signals output from the pixel region, wherein the readout circuit counts the number of the event signals read out from the pixel region, and when the number of the counted event signals exceeds a preset threshold within a predetermined period, the readout circuit discards the event signals read out from the pixel region, and transmits an acknowledge signal to the pixel region.

Further features of the present invention will become apparent from the following description of exemplary embodiments with reference to the attached drawings.

BRIEF DESCRIPTION OF THE DRAWINGS

FIG. 7 is a block diagram showing an example of an event signal readout circuit according to the second embodiment;

FIG. 11 is a block diagram showing an example of a pixel according to the third embodiment;

FIG. 13 is a block diagram showing an example of an arbiter according to the third embodiment;

FIG. 14 is a block diagram showing an example of a pixel of an image capturing apparatus according to the fourth embodiment;

FIG. 15 is a block diagram showing an example of an event signal readout circuit according to the fourth embodiment.

DESCRIPTION OF THE EMBODIMENTS

Figure 1:
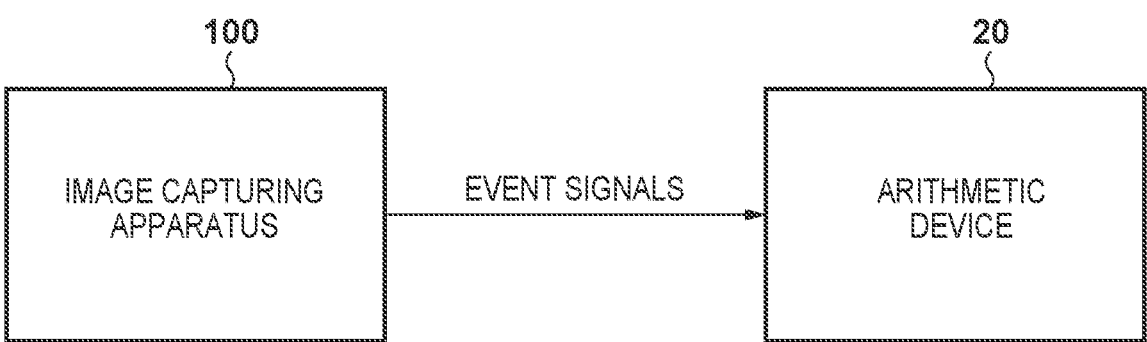
FIG. 1 is a block diagram showing an example of an image capturing system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[Image Capturing System]

An example of an image capturing system including an image capturing apparatus 100 according to this embodiment will be described with reference to FIG. 1.

The image capturing apparatus 100 detects a light amount variation as an event. Upon detecting an event, the image capturing apparatus 100 generates and outputs an event signal. An arithmetic device 20 executes a predetermined arithmetic operation upon receiving the event signal and obtains, for example, the position of a target object or an optical flow. In this case, the optical flow is vector information representing a motion for each pixel or region and is calculated based on a change in the occurrence position of an event that occurs in a predetermined region within a predetermined period. The image capturing apparatus 100 is not limited to one that generates an image and can be understood as an apparatus that generates an event signal.

The arithmetic device 20 is not limited to one that uses a microcomputer. This device may be a device to be incorporated, such as an application specific integrated circuit (ASIC) or a field programmable gate array (FPGA). The arithmetic device 20 may be a graphic processing unit (GPU) or a personal computer (PC). The arithmetic device 20 may be placed on the cloud. In addition, the image capturing apparatus 100 and the arithmetic device 20 need not be separated from each other and may be mounted on the same chip.

[Image Capturing Apparatus]

Figure 2:
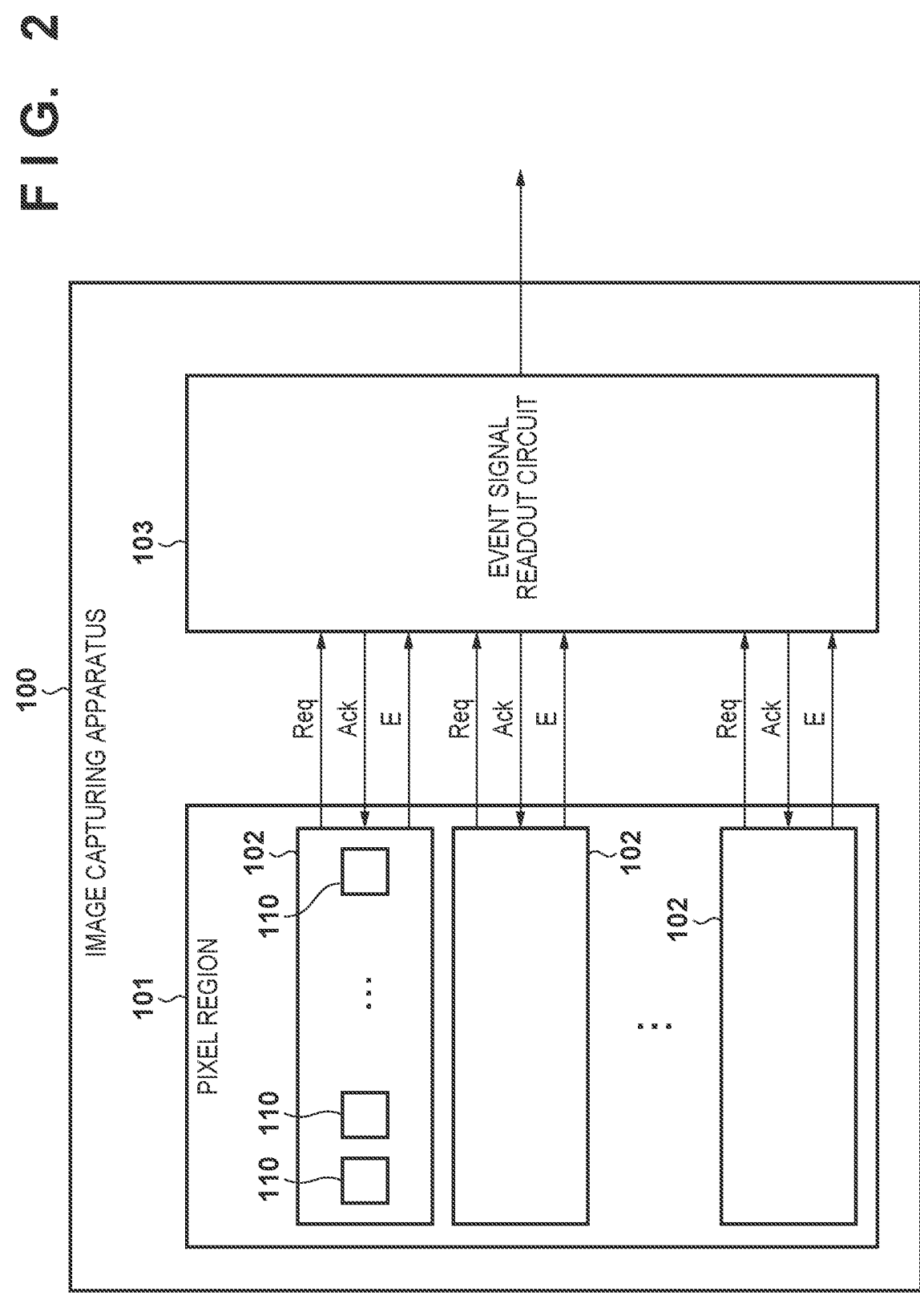
FIG. 2 is a block diagram showing an example of an image capturing apparatus according to the first embodiment.

The arrangement of the event-based image capturing apparatus 100 will be described with reference to FIG. 2. The image capturing apparatus 100 includes a pixel region 101 and an event signal readout circuit 103. A plurality of pixel row regions 102 are arranged in the pixel region 101. The pixel row region 102 includes a plurality of pixels 110. FIG. 2 shows an example in which the pixels 110 are arranged in the pixel region 101 in a two-dimensional array pattern. However, the pixels 110 may be arranged in another arrangement such as a one-dimensional line sensor pattern. The pixel 110 includes a photodiode for converting light into an electrical signal, for example, for photoelectric conversion and generates and outputs an event signal E upon detecting a variation in the quantity of incident light.

The pixel region 101 includes the plurality of pixel row regions 102 in which the plurality of pixels 110 are arranged along the rows. The plurality of pixel row regions 102 are arranged in the column direction. When the pixel 110 arranged in each pixel row region 102 generates the event signal E, the pixel row region 102 transmits the request signal Req requesting for the readout of the event signal E to the event signal readout circuit 103. The event signal readout circuit 103 can read out the event signal E by controlling the readout of the event signal E from the pixel region 101. The event signal readout circuit 103 can receive the event signal E transmitted from the pixel region 101 and transmit the event signal E to the outside of the image capturing apparatus 100 such as the arithmetic device 20.

The event signal readout circuit 103 receives the request signal Req from the pixel row region 102, selects a row from which an event signal is read out, and returns an acknowledge signal Ack to the selected row. The pixel 110 of the pixel row region 102 which has received the acknowledge signal Ack outputs the event signal E. The event signal readout circuit 103 receives the event signal E for the row. In addition, in the pixel 110 that has received the acknowledge signal Ack, event reset to be described later is performed.

In this embodiment, even with a change in imaging environment in which the quantity of light incident on a predetermined number or more of pixels 110 momentarily greatly varies, the acknowledge signal Ack is generated, and the pixels 110 perform event reset. In this case, event reset may be the operation of updating the settings for the detection of a light amount variation in the pixel 110. For example, specifically, letting VI be a signal potential indicating the quantity of incident light and Vb be a reference potential, when a variation in the quantity of incident light is to be detected based on the difference between the two potentials, event reset is an operation of updating the reference potential Vb with the signal potential VI to prepare for the next detection of a variation in the quantity of incident light.

[Pixel]

Figure 3:
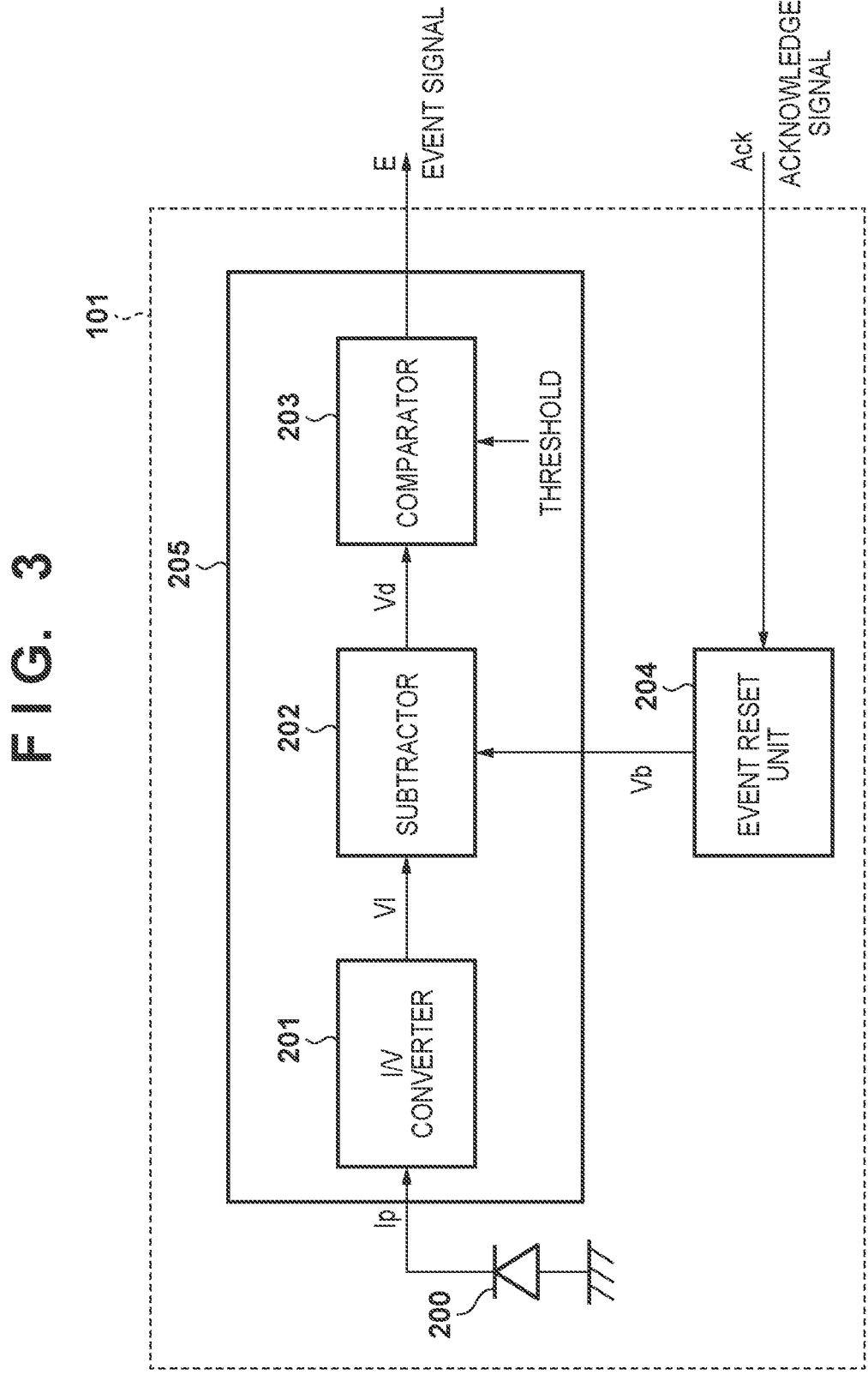
FIG. 3 is a block diagram showing an example of a pixel of the image capturing apparatus according to the first embodiment.

Each of the pixels 110 arranged in the pixel region 101 is a pixel that can detect a variation in the quantity of incident light (light amount) and generate the event signal E. The pixel 110 will be described with reference to FIG. 3. Each of the pixels 110 can include an event reset unit 204 and a light amount variation detector 205. Each of the light amount variation detectors 205 can include a device for converting incident light into an electrical signal, for example, a photodiode 200, a current/voltage (I/V) converter 201, a subtractor 202, and a comparator 203.

The photodiode 200 can generate a photocurrent Ip in accordance with the quantity of incident light. The I/V converter 201 can convert the photocurrent Ip into the signal potential VI. The subtractor 202 can output a difference potential Vd between the signal potential VI and the reference potential Vb set in the subtractor. The comparator 203 compares the difference potential Vd with a predetermined threshold. At this time, the comparator 203 may perform the comparison upon multiplying the difference potential Vd by a predetermined coefficient. Two thresholds, namely, a positive threshold T1 and a negative threshold T2 may be prepared. If the difference potential Vd exceeds the positive threshold T1 or falls below the negative threshold T2, the comparator 203 can generate the event signal E indicating a light amount variation in accordance with each case and output E=1 or E=−1. Otherwise, the comparator 203 outputs E=0. The positions of the pixels 110 arranged in the pixel region 101 in a two-dimensional array pattern can be specified by two-dimensional coordinates. Accordingly, the event signal E from the pixel 110 detected at given time t can be expressed by the following equation.

$$E(x, y, t) = \begin{cases} 1 & (Vd > T1) \\ -1 & (Vd < T2) \\ 0 & (\text{otherwise}) \end{cases} \tag{1}$$

where, x, y, and t in equation (1) indicate the event signal that is detected at positions x and y in a two-dimensional coordinate system (X-Y coordinate system) at time t when the pixels 110 where the event signal is detected are arranged in a two-dimensional array pattern. The time resolution of time t can be, for example, 1 µs. That is, a light amount variation can be detected with a time resolution of 1 µs. The event signal E is asynchronously generated independently of a frame synchronization signal like that in a general image sensor and hence can have a high time resolution. In this case, a light amount variation is called an event, and the occurrence or detection of an event means that the event signal E becomes 1 or −1. The event reset unit 204 performs event reset to update the reference potential Vb with the signal potential VI upon receiving an Ack signal from the event signal readout circuit 103.

When event rest is performed, since the reference potential Vb is replaced with the signal potential VI, difference potential Vd becomes "0", and the event signal E is cleared. Accordingly, the detection of a light amount variation with respect to the new reference potential Vb is resumed. This method for an event reset operation is an example, and an event reset operation may be performed by another method. For example, the threshold potential in the comparator may be changed in accordance with the difference potential Vd. The above arrangement makes it possible to detect a variation in the quantity of incident light as the event signal E in a spike form (pulse form). Note that the image capturing apparatus 100 can be implemented as a single-layer sensor or a multilayer sensor. When a multilayer sensor is to be used, for example, a boundary between the first layer and the second layer (Cu—Cu joint portion) may be provided at the boundary with I/V converter 201. That is, a photoelectric converter and a circuit for the processing of the photocurrent Ip and subsequent processing may be stacked on each other. Note that the image capturing apparatus 100 according to each embodiment in this specification may be a multilayer sensor having three or more layers. That is, the image capturing apparatus 100 according to each embodiment may be a multilayer sensor having two or more substrates stacked on each other.

[Pixel Row Region]

The pixel row region 102 will be described below by exemplifying the pixel row region 102 in which the pixels 110 are arranged in one row. If an event has occurred in at least one of the pixels 110 included in the row, that is, the event signal E becomes 1 or −1, the pixel row region 102 transmits the request signal Req requesting the readout of an event signal to the event signal readout circuit 103. The pixel row region 102 monitors the generation of the event signal E by the pixel 110. When one of the pixels 110 included in the pixel row region 102 generates the event signal E or a plurality of pixels 110 included in the pixel row region 102 almost simultaneously generate the event signals E in a predetermined period, the request signal Req is transmitted to the event signal readout circuit 103.

[Event Signal Readout Circuit]

Figure 4:
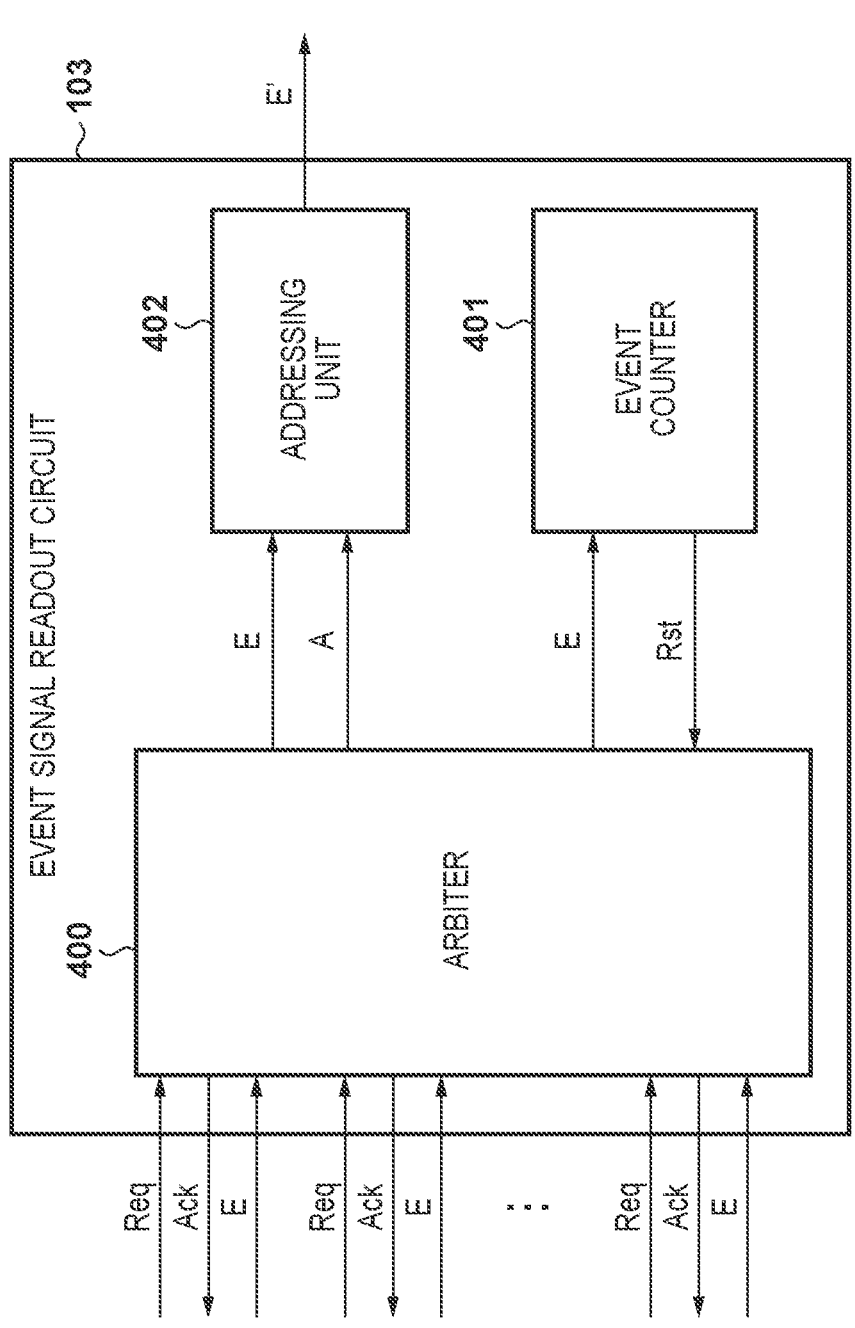
FIG. 4 is a block diagram showing an example of an event signal readout circuit according to the first embodiment.
Figure 5:
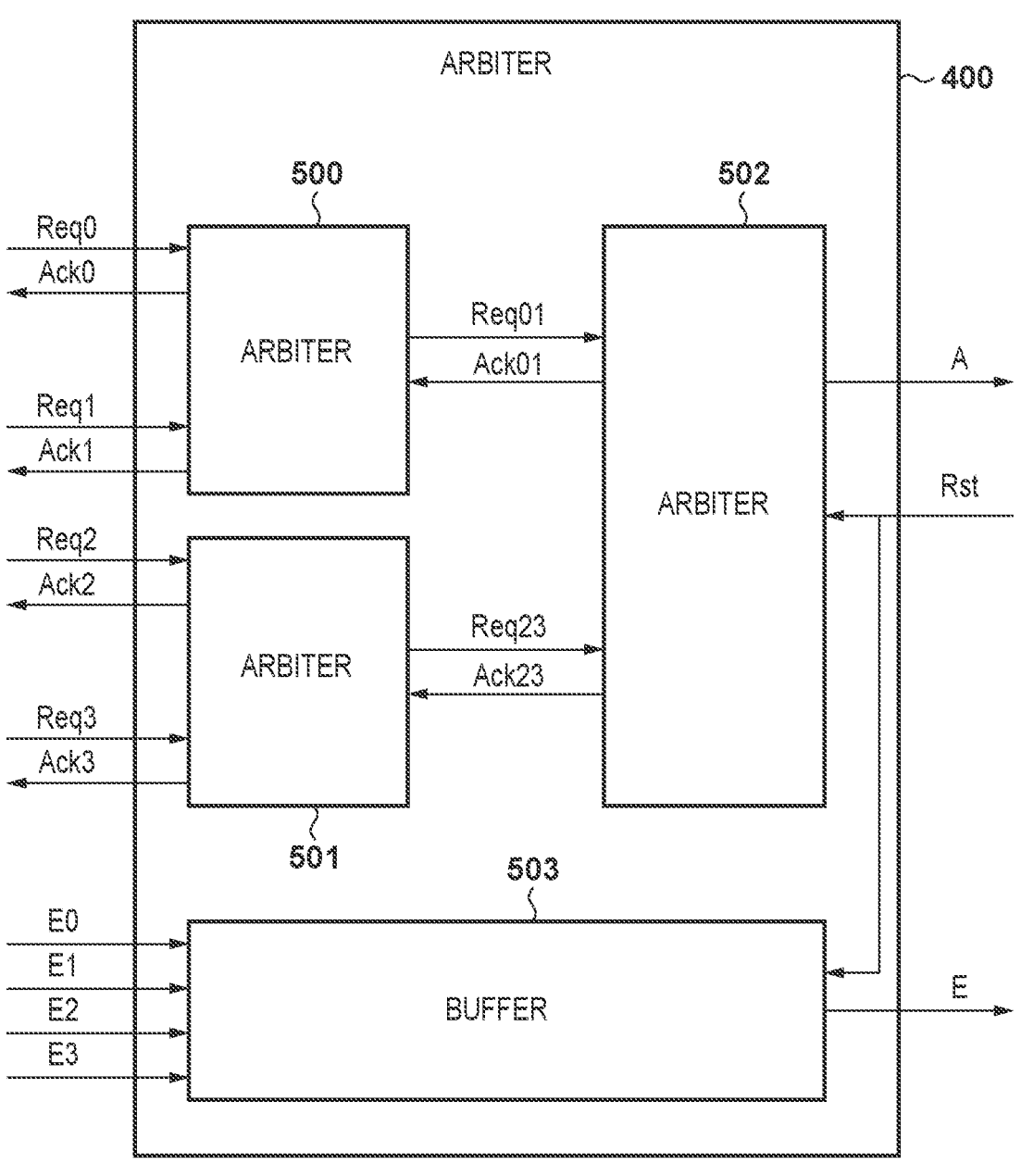
FIG. 5 is a block diagram showing an example of an arbiter according to the first embodiment.

The event signal readout circuit 103 will be described with reference to FIGS. 4 and 5. The event signal readout circuit 103 may include an arbiter 400, an event counter 401, and an addressing unit 402. When the plurality of pixel row regions 102 of the pixel region 101 almost simultaneously transmit the request signals Req, the arbiter 400 determines the sequential order of the pixel row regions 102 to read out event signals by arbitration when reading out event signals. If the temporal order is apparent, arbitration may be performed based on the temporal order. Alternatively, arbitration may be performed based on priority levels given to the pixels 110 or the pixel row regions 102 in advance, to be described later. In this case, the arbiter 400 determines the pixel row region 102 from which the event signal E is to be read out and outputs a row address signal A to the addressing unit 402.

The arbiter 400 transmits the acknowledge signal Ack to the pixel row region 102 from which readout of the event signal E is determined. The event signal E is read out from the pixel row region 102 that has received the acknowledge signal Ack. The readout event signal E is stored in a buffer 503. The pixel that has completed the output of the event signal E undergoes event reset. The addressing unit 402 transmits the event signal E read out from the buffer 503 outside as an addressed event signal E' attached with an address indicating a row and a column which indicate the position of the pixel 110 corresponding to the event signal E. At the same time, the addressing unit 402 transmits the event signal E to the event counter 401. When the event counter 401 receives more than a predetermined number of event signals E from the pixel region 101 in a predetermined period, the event counter 401 can notify the arbiter 400 of a change in imaging environment by transmitting an event reset signal Rst to the arbiter 400.

[Arbiter]

The arbiter 400 in the event signal readout circuit 103 will be described with reference to FIG. 5. For the sake of descriptive simplicity, assume that the number of the pixel row regions 102 is four. The arbiter 400 includes a first arbiter 500, a second arbiter 501, a third arbiter 502, and the buffer 503. Referring to FIG. 5, the arbiter 400 has a 4-input/1-output configuration and performs control so as to arbitrate the readout order from the four rows and output an event from a selected one row. The request signals Req corresponding to the four rows are represented as request signals Req0 to Req3, the acknowledge signals Ack are represented as acknowledge signals Ack0 to Ack3, and the event signals E are represented as event signals E0 to E3, respectively.

The first arbiter 500 has a 2-input/1-output configuration. When, for example, the request signals Req0 and Req1 from the pixel regions 101 are input within predetermined times, the first arbiter 500 selects one of the signals, for example, the request signal Req1, and transmits a request signal Req01 to the subsequent stage. In this case, the "predetermined times" indicates that the input times of the signals are regarded as almost the same time.

Likewise, when the transmission requests Req2 and Req3 are input at almost the same time, the second arbiter 501 selects one of the signals and transmits a request signal Req23 to the subsequent stage. In this embodiment, the request signals Req01 and Req23 can be respectively input from the first arbiter 500 and the second arbiter 501 to the third arbiter 502. Upon arbitrating the request signals, the third arbiter 502 outputs the acknowledge signal Ack01 or Ack 23 corresponding to the selected request signal to the first arbiter 500 or the second arbiter 501.

The third arbiter 502 selects one of the request signals Req01 and Req23 and returns acknowledge signal Ack01 or Ack23 corresponding to the selected request signal. The first arbiter 500 that has received the acknowledge signal Ack01 or the second arbiter 501 that has received the acknowledge signal Ack23 returns one of the acknowledge signal Ack0 to Ack3 which corresponds to the selected transmission request Req to the pixel region 101. In this manner, the acknowledge signal Ack is returned to the pixel row region 102 upon tracing back the flow of the request signal Req relayed from the arbiter on the previous stage to the arbiter on the subsequent stage, thereby determining the pixel row region 102 from which an event signal is to be read out.

The event signals E are sequentially read out from the pixels 110 of the pixel row region 102 that has received the acknowledge signal Ack, and the event signals corresponding to one row are stored in the buffer 503. The buffer 503 sequentially outputs the event signals E corresponding to one row to the subsequent stage. At this time, the third arbiter 502 transmits a row address A corresponding to the event signals E corresponding to one row output from the buffer 503.

When the event reset signal Rst is input from the event counter 401 to the third arbiter 502, the interim state of the arbitration is cleared, and the first arbiter 500 and the second arbiter 501 simultaneously transmit the acknowledge signals Ack0, Ack1, Ack2, and Ack3. At the same time, the event signals E held in the buffer 503 are discarded. Transmitting the acknowledge signals Ack0, Ack1, Ack2, and Ack3 to the pixel region 101 will perform event reset of the pixels 110 corresponding to four rows. This makes it possible to update the settings for the detection of a light amount variation in each pixel to detect a new light amount variation. In addition, upon receiving the event reset signal Rst, the first arbiter 500 and the second arbiter 501 may discard the event signals E received by the arbiter 400 or receive no event signal, while the event reset of the pixels 110 is completed.

The above description is based on the assumption that the number of the pixel regions 101 from which signals are input to the arbiter 400 is four. However, this embodiment can be implemented with an arbitrarily number of rows. In addition, the arbiter has a 2-stage configuration including the first arbiter 500 and the second arbiter 501 on the first stage and the third arbiter 502 on the second stage. However, the number of stages can be arbitrary changed in accordance with the number of the pixel row regions 102 to be arbitrated. In addition, one arbiter may be configured as a circuit that receives multiple inputs exceeding two inputs. Arbitration may be performed for each group of pixels instead of each row. In this case, the order of groups may be arbitrated to read out event signals.

[Event Counter]

The event counter 401 of the event signal readout circuit 103 counts the number of the event signals E received within a predetermined period. Assume that a threshold is set for the count, and the count exceeds the threshold, that is, events larger in number than the threshold have occurred within a predetermined period and have been counted. In this case, the event counter 401 transmits the event reset signal Rst to the arbiter 400 to reset the count to 0. A change in imaging environment can be notified by transmitting the event reset signal Rst to the arbiter 400. If the count increases on the way, the count of the event counter 401 is periodically reset to 0 to prevent the event counter 401 from erroneously detecting that many changes have occurred. The predetermined period may be determined in consideration of a period from when counting is started upon a change in imaging environment like a simultaneous change in light incident on the pixel regions 101 to when the count reaches the threshold.

[Addressing Unit]

The addressing unit 402 transmits, to the arithmetic device 20, the addressed event signal E'. The addressed event signal E' is obtained by attaching a row address and a column address, which indicate the position of the pixel that has output the event signal E, to the event signal E received from the arbiter 400. At this time, to thin out event signal E=0 in which no event has occurred, no address may be attached to the event signal represented by event signal E=0.

In the above manner, when the imaging environment greatly changes, since the delay time from when the event signal E is read out to when the next event signal E can be obtained again is shortened, a deterioration in time resolution can be suppressed. For example, 20% of the total number of pixels may be set as a threshold for a change in imaging environment in the event counter 401. This eliminates the necessity to read out all event signals until the event signal E can be obtained again after a change in imaging environment. Ideally, this reduces the time taken to obtain an event again to 20% and also reduces the power consumption as compared with the case where all event signals are read out. The numerical value "20%" is an example, and the threshold for a change in imaging environment can be set to an arbitrary value in accordance with the time resolution, the detection accuracy, or the like.

<Priority Determination Unit>

Figure 6:
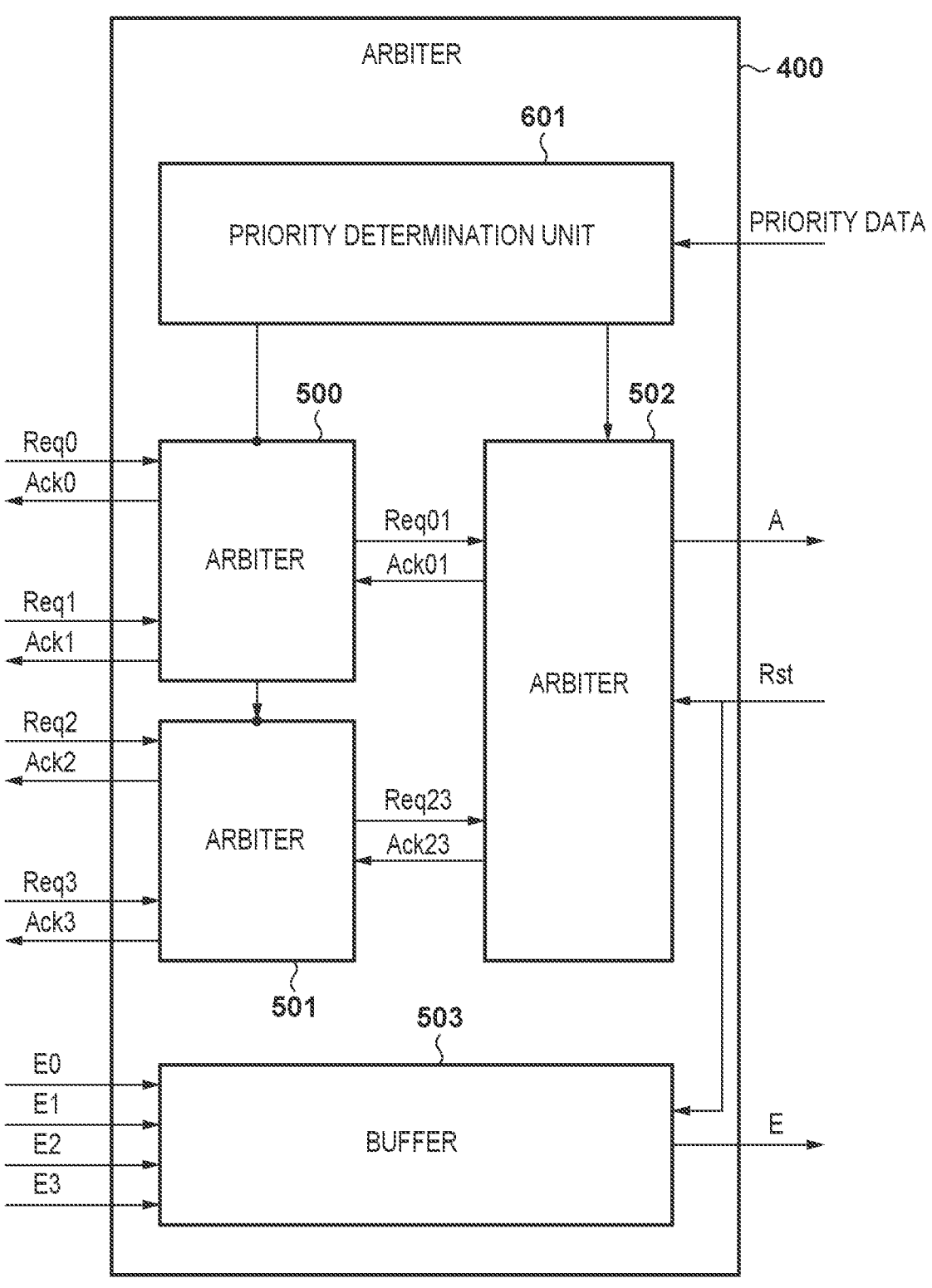
FIG. 6 is a block diagram showing an example of the arbiter according to the first embodiment.

The next is a description of an example of providing the arbiter 400 of the event signal readout circuit 103 with a priority determination unit that determines the readout order of event signals with respect to the pixel row regions 102. The arbiter 400 according to this embodiment will be described with reference to FIG. 6. The case in FIG. 6 differs from the case in FIG. 5 in that a priority determination unit 601 is added. The arbiter 400 receives, for example, priority data from the arithmetic device 20 on the subsequent stage and determines priority as the order in which the arbiter 400 returns the acknowledge signals from Ack0 to Ack3. When a Req signal corresponding to an Ack signal with high priority has been input, an Ack signal corresponding to the corresponding request signal Req is selected and transmitted.

Assume that the request signals Req have been generated in all the rows. In this case, when, for example, the acknowledge signals Ack0, Ack1, Ack2, and Ack3 are to be transmitted in this order without any consideration to priority, the event signals E are sequentially read out from an upper part of the pixel region 101. If the threshold for the count of the event counter 401 may be set to half of the number of pixels of the pixel region 101, there is a possibility to detect that a change in imaging environment has occurred in only an upper part of the screen of the pixel region 101. Accordingly, even if a necessary event has been detected in lower part of the screen, it may not be read out, and the event signal E may be discarded by event reset.

In this embodiment, it is possible to prevent a unbalanced spatial distribution of the counted event signals E by making settings so as to read out the event signals E while thinning out the signals throughout the screen and then reading out the portions that have not been read out. More specifically, for example, the priority is set in the order of rows corresponding to Ack0, Ack2, Ack1, and Ack3 so that they are not consecutive order. When the request signals Req from all the rows are received, the event signals E are received in the order of Ack0, Ack2, Ack1, and Ack3. This makes it possible to uniformly read out the event signals E throughout the screen while thinning out event signals as compared with the case of readout from upper part of the screen of the pixel region 101. It can be expected to improve the detection accuracy of a change in imaging environment. In addition, the priority order is set for every two rows like the acknowledge signals Ack0, Ack2, Ack1, and Ack3. If, however, there are rows from Ack0 to Ack99, the priority order may be set for every 10 rows like the acknowledge signals Ack10, Ack20, and Ack30. Priority orders may be set based on any number of rows and any row intervals. Alternatively, readout need not be performed at equal intervals as long as unbalanced distribution does not occur throughout the screen.

Second Embodiment

Figure 7:
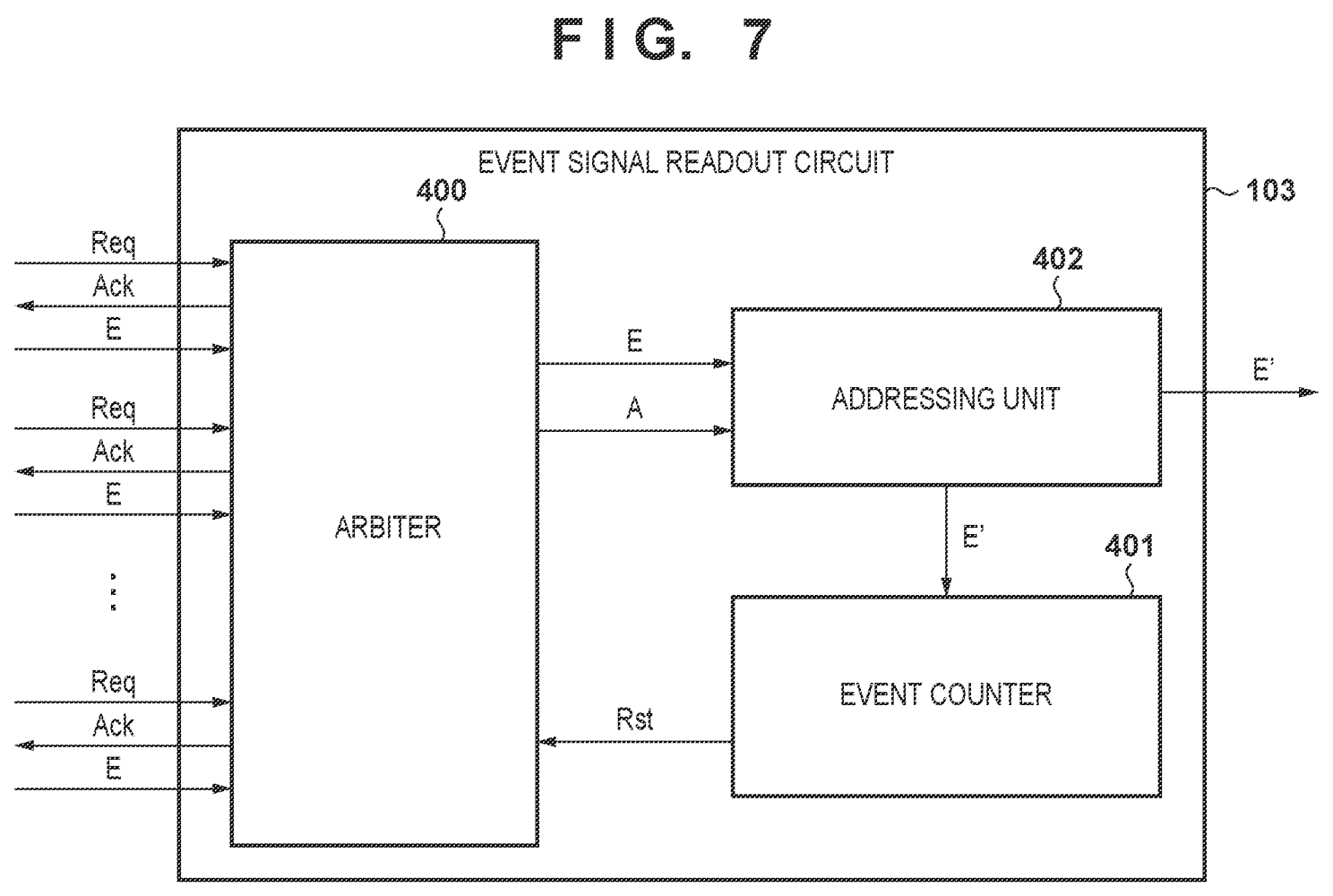

This embodiment will exemplify a case where a pixel 110 at a predetermined address among the pixels 110 is set as a detection pixel 901, and an event counter 401 counts event signals from the detection pixel 901. FIG. 7 shows an event signal readout circuit 103 according to the embodiment. The second embodiment differs from the first embodiment in that an event signal E input to the event counter 401 is an addressed event signal E' via an addressing unit 402. The addressed event signal E' is input to the event counter 401. The event counter 401 counts only the addressed event signal E' from the pixel at the address set in advance as the detection pixel 901. If the addressed event signals E' larger in number than a threshold are generated in a predetermined period, the event counter 401 transmits an event reset signal Rst and causes the pixel region 101 to perform an event reset operation.

Figure 8:
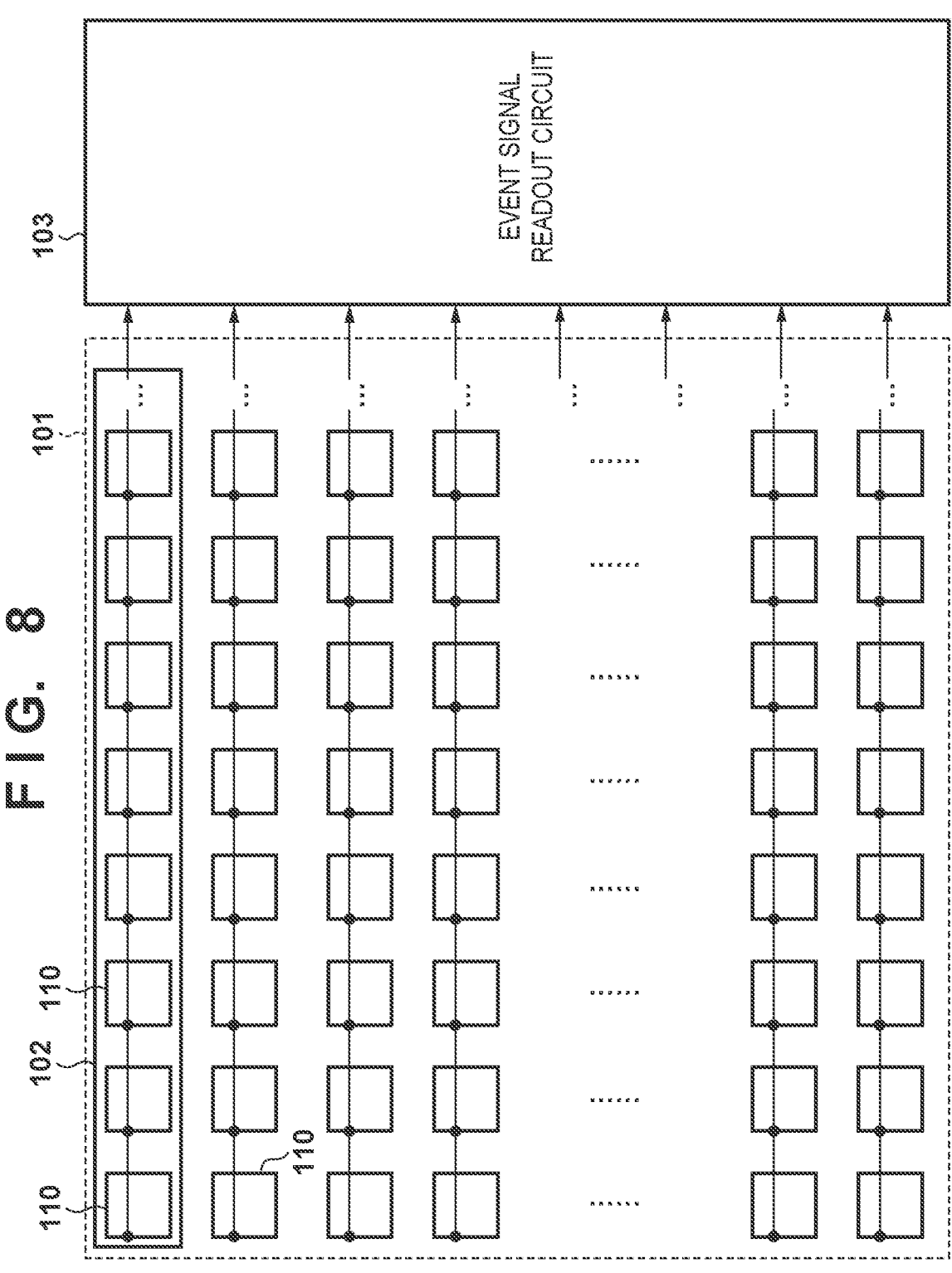
FIG. 8 is a block diagram showing an example of a pixel region according to an embodiment.
Figure 9:
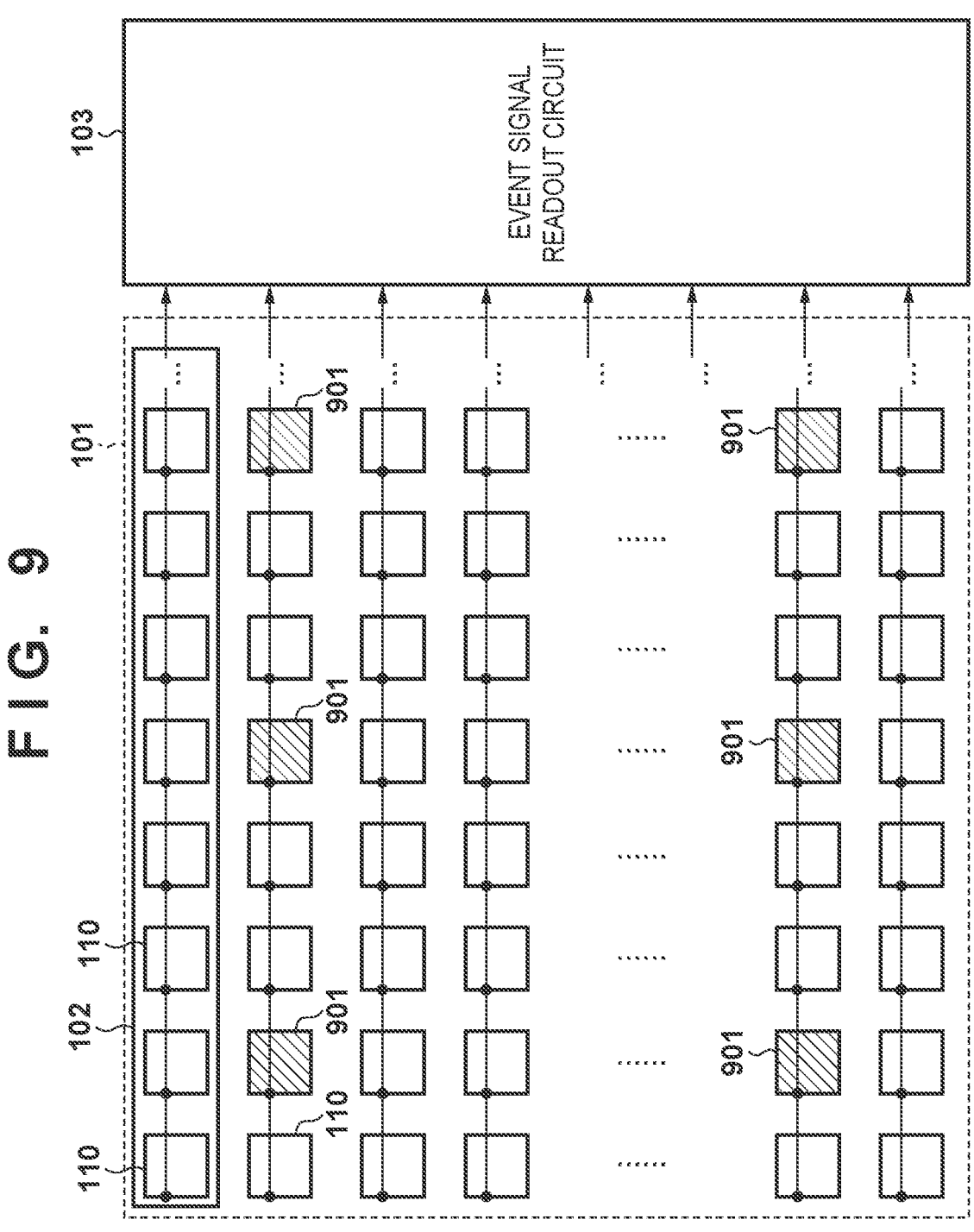
FIG. 9 is a block diagram showing an example of a pixel region according to the second embodiment.

FIG. 8 shows an example showing the pixel region 101 in detail. In this case, the arrangement of the pixel region 101 is an example for an explanation. As in FIG. 2, a Req signal, an Ack signal, and the event signal E are transmitted and received between a pixel row region 102 and the event signal readout circuit 103. FIG. 9 shows an example in which the detection pixels 901 are arranged in the pixel region 101. The detection pixel 901 is indicated by a hatched square. As described above, the second embodiment differs from the first embodiment in that pixels at predetermined addresses among the pixels 110 are set as the detection pixels 901. The arrangement of the detection pixel 901 is the same as that of the pixel 110. The addressed event signals E' from the detection pixels 901 are those to be counted by the event counter 401 when it counts the number of event signals. In this case, evenly setting the addresses of the detection pixels 901 throughout the screen of the pixel region 101 so as to prevent an unbalanced distribution on the screen can implement the function of detecting a change in imaging environment with respect to the entire screen.

Setting the detection pixels 901 in a predetermined range and making a row including the predetermined range be a row for sending an acknowledge signal Ack can detect a change in imaging environment only in a partial range and perform an event reset operation. In addition, for example, dividing the pixel row region 102 makes it possible to perform an event reset operation for a group of a plurality of columns or for each column.

This operation makes it possible to set a smaller threshold for the count for the detection of a change in imaging environment by the event counter 401. The event counter 401 can detect a change in imaging environment by counting the addressed event signals E' smaller in number than in the first embodiment. Counting a small number of addressed event signals E' can reduce the computational load required for detection and shorten the time from when a change in imaging environment is detected to when the detection of an event is started upon event reset of the pixel region 101. In addition, only a partial region of the screen may be set as a target for the detection of a change in imaging environment by setting the detection pixels 901 in only the partial region of the screen and making settings to perform event reset for only the part. Setting only a partial region as the detection pixels 901 can properly detect a change in imaging environment even in a situation in which a change in imaging environment occurs in only a local region.

Third Embodiment

Figure 10:
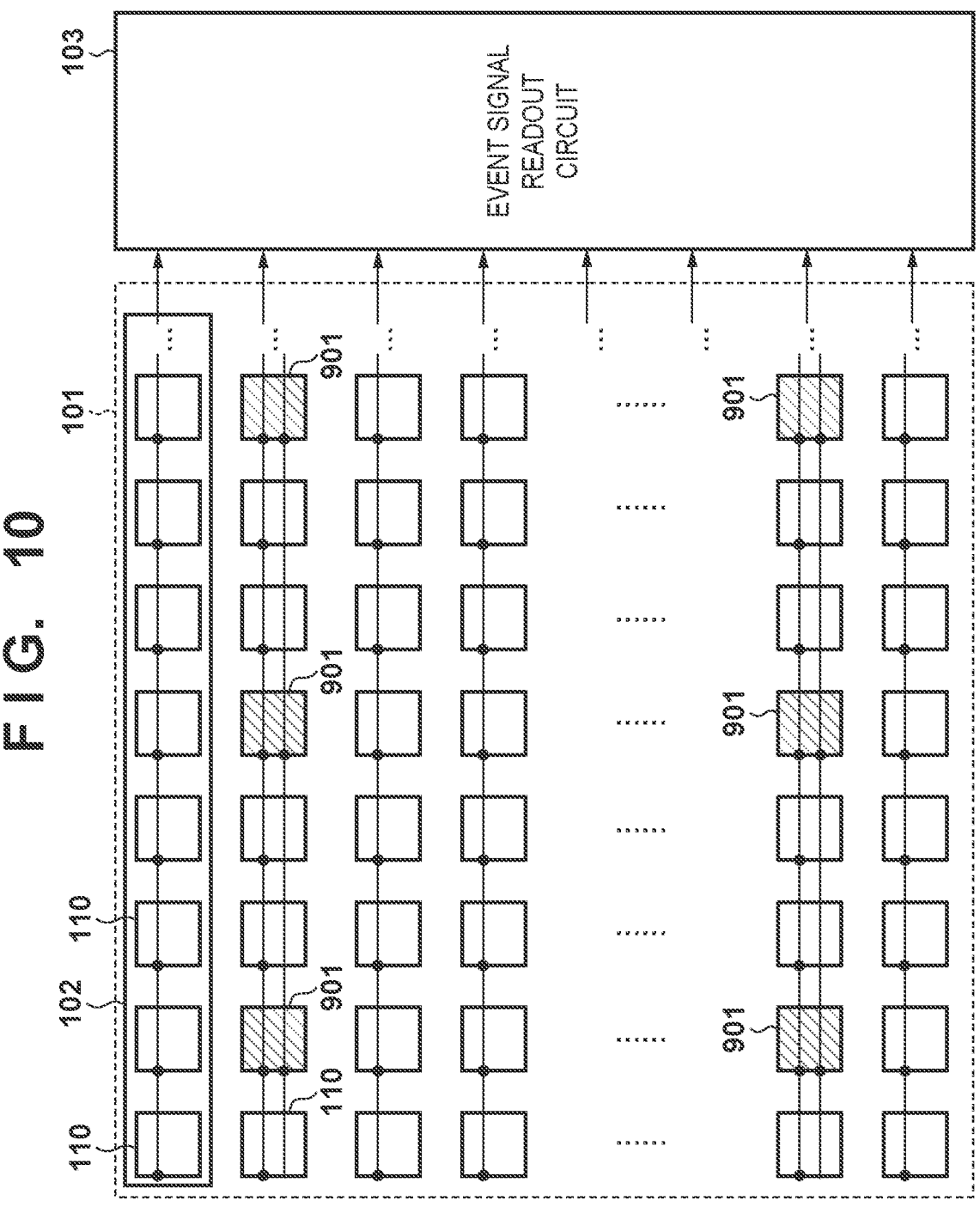
FIG. 10 is a block diagram showing an example of a pixel region according to the third embodiment.
Figure 11:
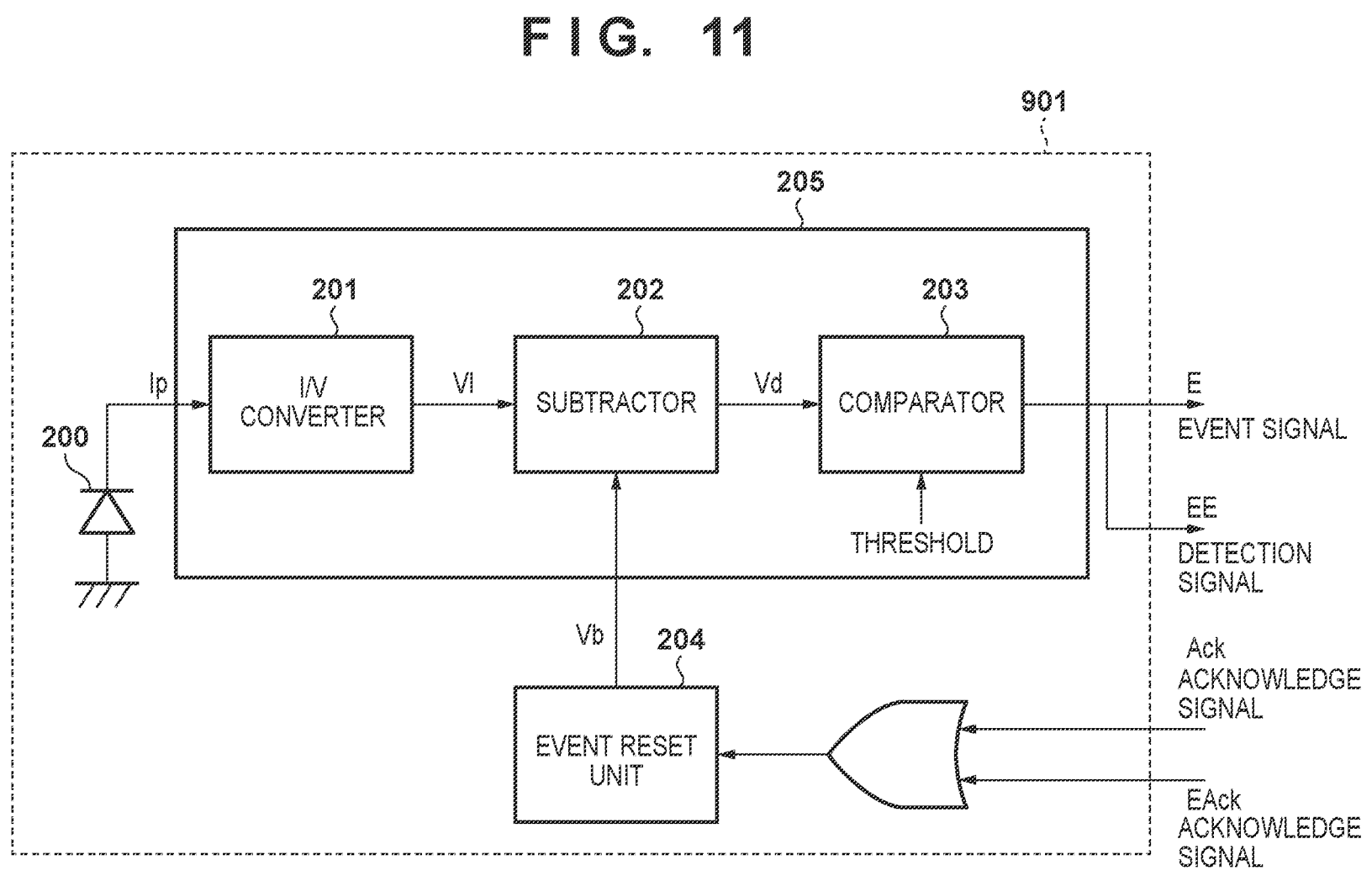
Figure 12:
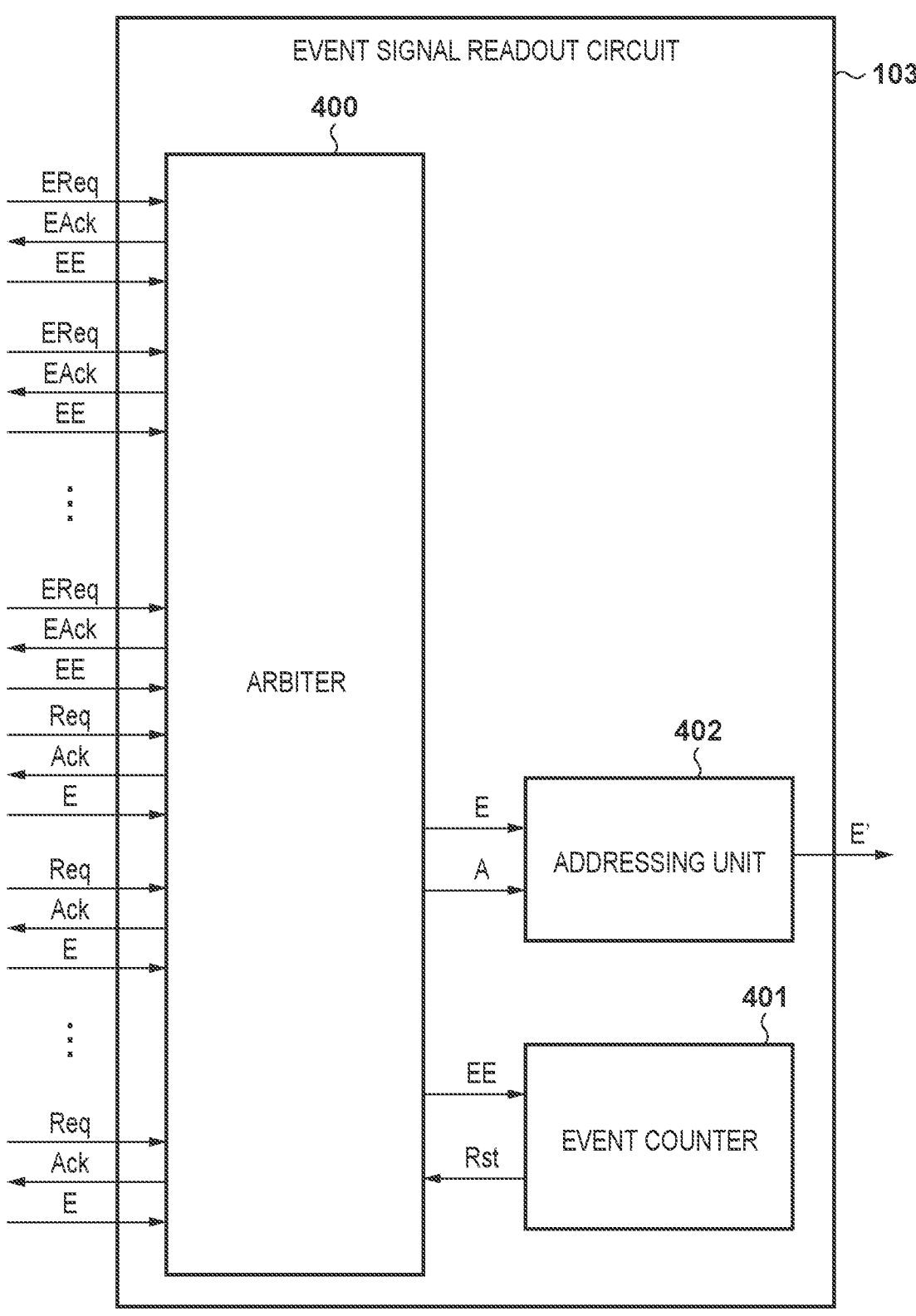
FIG. 12 is a block diagram showing an example of an event signal readout circuit according to the third embodiment.

In the third embodiment, an event signal readout circuit 103 is connected to detection pixels 901 via a path different from a path for reading out a normal event signal E. In this case, the event signal E from the different path is a detection signal EE for detecting a change in environment. An event counter 401 detects a change in imaging environment by counting the detection signals EE. This embodiment will be described with reference to FIG. 10 showing the arrangement of the detection pixel 901, FIG. 11 showing the arrangement of a pixel 110, FIG. 12 showing the arrangement of the event signal readout circuit 103, and FIG. 13 showing the arrangement of an arbiter 400.

As in the second embodiment, the detection pixels 901 are set from among the pixels 110. The detection pixel 901 has almost the same arrangement as that of the pixel 110 but outputs the event signal E to be counted as the detection signal EE independently of the event signal E. The event counter 401 counts the number of the detection signals EE. If the number of the detection signals EE exceeds a threshold, the event counter 401 outputs an event reset signal Rst. The arbiter 400 that has received the event reset signal Rst transmits an acknowledge signal EAck to the detection pixel 901. In addition, the arbiter 400 can transmit the acknowledge signal Ack to the pixel 110 in accordance with the reception of the event reset signal Rst. Event reset is performed in the detection pixel 901, and a reference potential Vb is updated with a signal potential VI. Event reset can also be performed in the pixel 110 that has received the acknowledge signal Ack corresponding to the event reset signal Rst.

The arbiter according to this embodiment includes a fourth arbiter 1301 connected to the detection pixel 901 and a buffer 1302. The fourth arbiter 1301 performs an operation similar to that performed by a third arbiter 502 to arbitrate a request signal EReq corresponding to the detection signal EE and transmit the acknowledge signal EAck. The buffer 1302 receives the detection signal EE from the detection pixel 901.

Note that FIG. 13 shows an example in which request signals EReq0 and EReq2 from detection pixels are connected to the arbiter 1301 as an example of spatially coarsely reading out the detection signals EE. Detection signals EE, from the detection pixels 901 in the pixel row regions corresponding to the request signals EReq0 and Ereq2, are counted. The corresponding rows are set as target rows to be counted. Directly connecting the detection signal EE to the event counter 401 makes it possible to transmit only the detection signal EE required for the detection of a change in imaging environment to the event counter 401 without going through the addressing unit 402. This can shorten the delay time as compared with a case where the detection signal EE is transmitted via the addressing unit 402.

Fourth Embodiment

Figure 14:
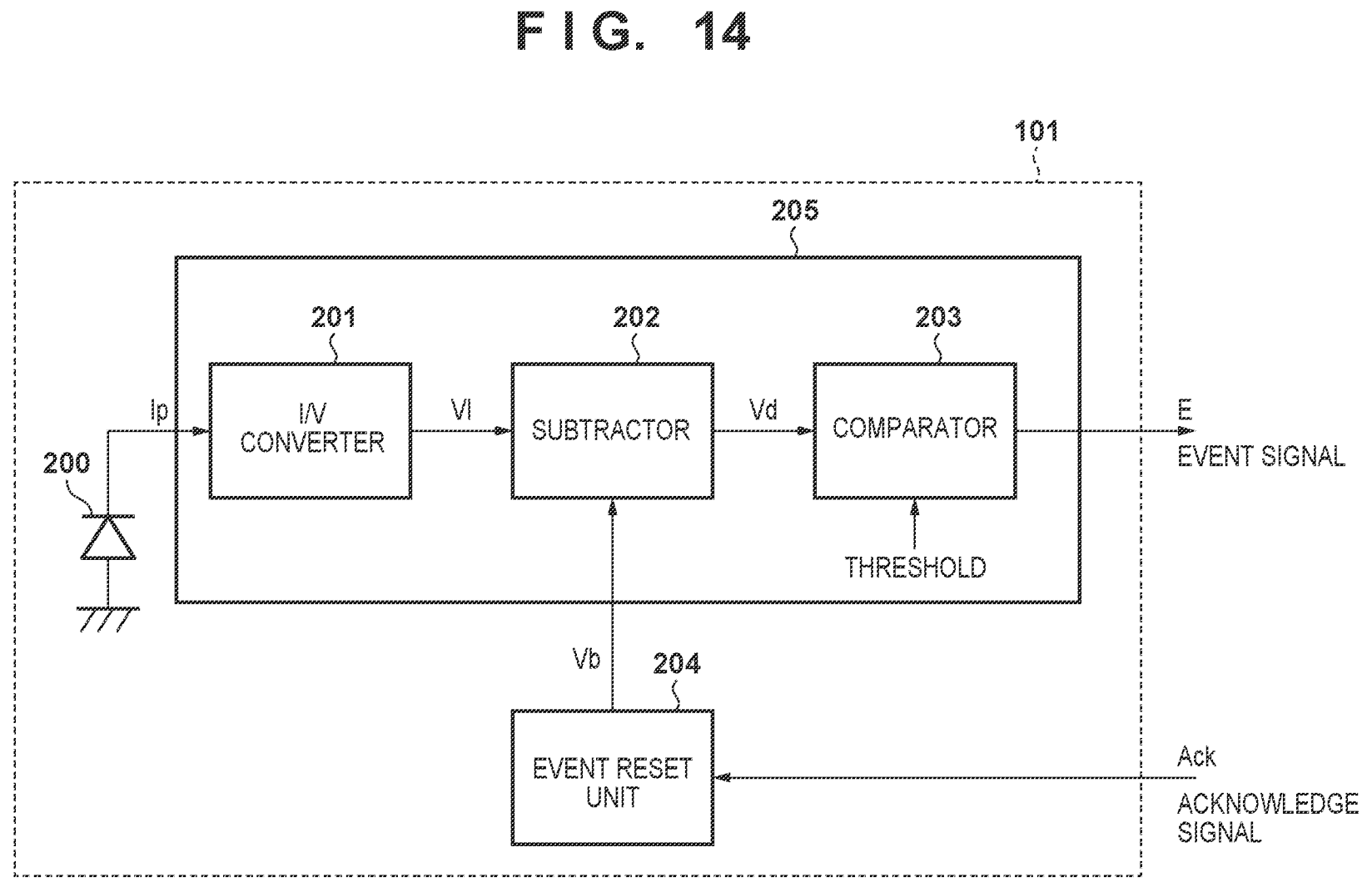

FIG. 14 shows the arrangements of a pixel region 101 and both an event reset unit 204 and a light amount variation detector 205 included in a pixel arranged in the pixel region 101. FIG. 15 shows the arrangement of an event signal readout circuit 103. Pixels 110 are arranged in a matrix pattern in the pixel region 101 in a similar manner to that shown in FIG. 8. In this embodiment, an event receiver 1600 is arranged in place of the event counter 401 of the event signal readout circuit 103 according to the first embodiment, and the addressing unit 402 is omitted. In addition, in the second embodiment, event signals E from the pixels 110 arranged in a matrix pattern are read out by the raster scan scheme. The raster scan scheme is a scheme of reading out the event signals E for each row from the pixels 110 arranged in a matrix pattern for each predetermined period regardless of the occurrence of an event unlike the scheme using the arbiter according to the first embodiment.

This eliminates the necessity of the request signal Req indicating the occurrence of an event generated from the pixel region 101 as described in the first embodiment. In addition, since the readout order of the pixels 110 is determined in advance, the addressing unit 402 is not required. It is possible to determine the position where an event signal E is received and the event signal E is generated without using any request signal Req between the event signal readout circuit 103 and the pixel region 101.

In this embodiment as well, the event counter 401 counts the event signals E to detect a change in imaging environment. The event receiver 1600 receives the event signals E read out from the pixel regions by the raster scan scheme. The event counter 401 counts the number of the event signals E. If the number of the event signals E exceeds a threshold, the event counter 401 outputs an event reset signal Rst. The event receiver 1600 that has received the event reset signal Rst transmits an acknowledge signal Ack to the pixel region 101 in response to the reception of the event reset signal Rst. Event reset is performed in the pixel 110 that has received the acknowledge signal Ack.

With this operation, when the many event signals E are read out upon a great change in imaging environment as in other embodiments even in the raster scan scheme, the delay time until the next event signal E can be obtained again is shortened. Accordingly, it is possible to suppress a deterioration in time resolution.

In this embodiment, settings can be made so as to read out the event signals E at some intervals while thinning out rows for each set row count, and after the event signals E has been reading out, the rows that have not been read out can be read out. Controlling rows to be read out can prevent spatially unbalanced distributions of the event signals E to be counted.

<Use of Image Capturing Apparatus in Equipment>

Figure 16:
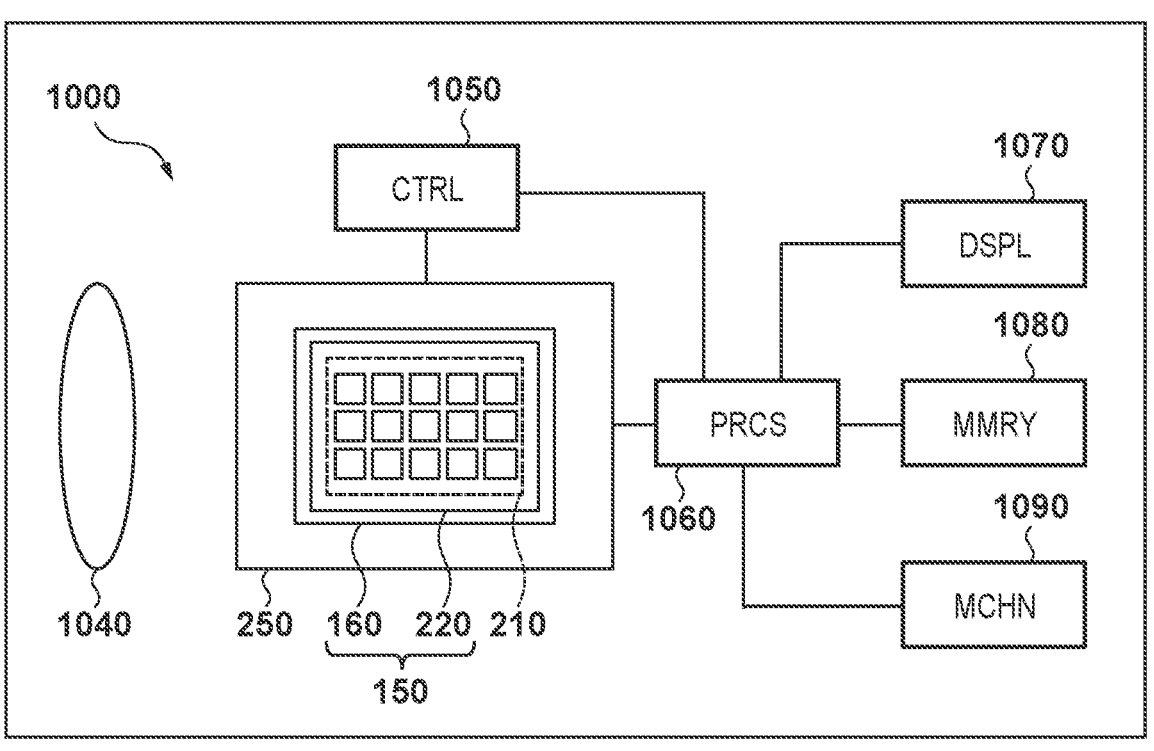
FIG. 16 is a block diagram showing an example of the application of the present invention to equipment.

The following is a description of equipment 1000 including a semiconductor device 250 including a package 150 on which a semiconductor chip 210 including the image capturing apparatus 100 described above is mounted, as shown in FIG. 16. The semiconductor chip 210 is accommodated in the package 150 and mounted on the equipment 1000. The semiconductor device 250 can include the package 150 including a base 160 on which the semiconductor chip 210 is fixed and a light transmissive member 220 such as glass that faces the semiconductor chip 210. The package 150 can be provided with joining members such as wires and bumps that connect inner leads provided on the base 160 to terminals such as pad electrodes provided on the semiconductor chip 210.

The equipment 1000 can include at least one of an optical apparatus 1040, a control apparatus 1050, a processing apparatus 1060, a display apparatus 1070, a storage apparatus 1080, and a mechanical apparatus 1090. The optical apparatus 1040 is implemented by, for example, a lens, a shutter, and a mirror. The control apparatus 1050 controls the semiconductor chip 210. The control apparatus 1050 is, for example, a semiconductor apparatus such as an ASIC.

The processing apparatus 1060 processes a signal output from the semiconductor chip 210. The processing apparatus 1060 is a semiconductor device such as a CPU or an ASIC for forming an Analog Front End (AFE) or a Digital Front End (DFE). For example, an image may be generated based on the event signals E. The display apparatus 1070 displays information (image) obtained by the semiconductor chip 210. The storage apparatus 1080 is a magnetic device or a semiconductor device that stores the information (image) obtained by the semiconductor chip 210. The storage apparatus 1080 is a volatile memory such as an SRAM or a DRAM, or a nonvolatile memory such as a flash memory or a hard disk drive.

The mechanical apparatus 1090 includes a moving or propulsion unit such as a motor or an engine. In the equipment 1000, the signal output from the semiconductor chip 210 is displayed on the display apparatus 1070 or transmitted to an external apparatus by a communication apparatus (not shown) included in the equipment 1000. Hence, the equipment 1000 may further include the storage apparatus 1080 and the processing apparatus 1060 in addition to the memory circuits and arithmetic circuits included in the semiconductor chip 210. The mechanical apparatus 1090 may be controlled based on the signal output from the semiconductor chip 210.

In addition, the equipment 1000 is suitable for electronic equipment such as an information terminal (for example, a smartphone or a wearable terminal) which has a image capturing function or a camera (for example, an interchangeable lens camera, a compact camera, a video camera, or a monitoring camera). The mechanical apparatus 1090 in the camera can drive the components of the optical apparatus 1040 in order to perform zooming, an in-focus operation, and a shutter operation. Alternatively, the mechanical apparatus 1090 in the camera can move the semiconductor chip 210 in order to perform an anti-vibration operation.

Furthermore, the equipment 1000 can be transportation equipment such as a vehicle, a ship, or an airplane. The mechanical apparatus 1090 in the transportation equipment can be used as a moving apparatus. The equipment 1000 as the transportation equipment is suitable for an apparatus that transports the semiconductor chip 210 or an apparatus that uses an image capturing function to assist and/or automate driving (steering). The processing apparatus 1060 for assisting and/or automating driving (steering) can perform, based on the information obtained by the semiconductor chip 210, processing for operating the mechanical apparatus 1090 as a moving apparatus. Alternatively, the equipment 1000 may be medical equipment such as an endoscope, measurement equipment such as a distance measurement sensor, analysis equipment such as an electron microscope, office equipment such as a copy machine, or industrial equipment such as a robot.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025531, filed Feb. 21, 2023, and Japanese Patent Application No. 2023-204131, filed Dec. 1, 2023, which are hereby incorporated by reference herein in their entirety.

What is claimed is:

1. An image capturing apparatus comprising:
a pixel region having a plurality of pixels configured to generate and output event signals upon detecting a variation in quantity of incident light; and
a readout circuit configured to read out the event signals output from the pixel region,
wherein the readout circuit counts the number of the event signals read out from the pixel region, and when the number of the counted event signals exceeds a preset threshold within a predetermined period, the readout circuit discards the event signals read out from the pixel region, and transmits an acknowledge signal to the pixel region,
the pixel detects a new variation in the quantity of incident light in accordance with the acknowledge signal,
the pixel updates a setting for detection of a variation in the quantity of incident light in accordance with the acknowledge signal, and
the readout circuit further transmits the acknowledge signal to the pixel that has output the event signal upon reading out the event signal.

2. The apparatus according to claim 1, wherein the pixel detects a new variation in the quantity of incident light in accordance with the acknowledge signal.

3. The apparatus according to claim 1, wherein the pixel updates a setting for detection of a variation in the quantity of incident light in accordance with the acknowledge signal.

4. The apparatus according to claim 1, wherein the readout circuit further transmits the acknowledge signal to the pixel that has output the event signal upon reading out the event signal.

5. The apparatus according to claim 1, wherein the pixel comprises a light amount variation detector, the light amount variation detector comprising:
a photodiode configured to output a photocurrent corresponding to a quantity of incident light,
a current/voltage converter configured to convert the photocurrent into a signal potential,
a subtractor configured to output a potential corresponding to a difference between the signal potential and a reference potential, and
a comparator configured to compare an output from the subtractor with a threshold and output a signal when an output from the subtractor exceeds the threshold.

6. The apparatus according to claim 5, wherein the light amount variation detector updates the reference potential with the signal potential in accordance with the acknowledge signal.

7. The apparatus according to claim 1, wherein the readout circuit further comprises an arbiter configured to arbitrate, when the pixel region generates a plurality of the event signals in a predetermined period, a readout order of the event signals from among the plurality of event signals.

8. The apparatus according to claim 6, wherein the readout circuit further comprises an arbiter configured to arbitrate, when the pixel region generates a plurality of the event signals in a predetermined period, a readout order of the event signals from among the plurality of event signals.

9. The apparatus according to claim 8, wherein the arbiter further comprises a priority determination unit configured to hold priority corresponding to a readout order of the event signals and performs the arbitration based on the priority.

10. The apparatus according to claim 1, wherein the readout circuit further comprises an addressing unit configured to output an event signal read out from the pixel upon attaching an address corresponding to a position of the pixel to the event signal, and
the readout circuit counts how many of the event signals have a predetermined address attached there to, and when the number of the counted event signals exceeds a threshold, the readout circuit discards the event signals read out from the pixel region and transmits the acknowledge signal to the pixel region.

11. The apparatus according to claim 1, wherein a predetermined pixel of the pixels is a detection pixel, and
the readout circuit counts the event signals read out from the detection pixel, and when the number of the counted event signals exceeds a threshold, the readout circuit discards the event signals read out from the pixel region and transmits an acknowledge signal to the pixel region.

12. The apparatus according to claim 11, wherein the detection pixel comprises:
a photodiode configured to output a photocurrent corresponding to a quantity of incident light,
a current/voltage converter configured to convert the photocurrent into a signal potential,
a subtractor configured to output a potential corresponding to a difference between the signal potential and a reference potential, and
a comparator configured to compare an output from the subtractor with a threshold and output a signal when an output from the subtractor exceeds the threshold,
wherein the reference potential is updated with the signal potential when the acknowledge signal is received.

13. The apparatus according to claim 1, wherein a plurality of pixels are arranged in a matrix pattern in the pixel region, and the pixel circuit reads out event signals for each row from the pixel region.

14. An image capturing system comprising:
an image capturing apparatus defined in claim 1; and
an arithmetic device configured to process a signal output from the image capturing apparatus.

15. Equipment comprising:
an image capturing apparatus defined in claim 1; and
a processing apparatus configured to process a signal output from the image capturing apparatus.

16. An image capturing apparatus comprising:
a pixel region having a plurality of pixels configured to generate and output event signals upon detecting a variation in quantity of incident light; and
a readout circuit configured to read out the event signals output from the pixel region,
wherein the readout circuit counts the number of the event signals read out from the pixel region, and when the number of the counted event signals exceeds a preset threshold within a predetermined period, the readout circuit discards the event signals read out from the pixel region, and transmits an acknowledge signal to the pixel region,
the pixel comprises a light amount variation detector, the light amount variation detector comprising:
a photodiode configured to output a photocurrent corresponding to a quantity of incident light,
a current/voltage converter configured to convert the photocurrent into a signal potential,
a subtractor configured to output a potential corresponding to a difference between the signal potential and a reference potential, and a comparator configured to compare an output from the
subtractor with a threshold and output a signal when
an output from the subtractor exceeds the threshold,
and the light amount variation detector updates the reference
potential with the signal potential in accordance with
the acknowledge signal.

17. An image capturing apparatus comprising:

a pixel region having a plurality of pixels configured to
generate and output event signals upon detecting a
variation in quantity of incident light; and a readout circuit configured to read out the event signals
output from the pixel region, wherein the readout circuit counts the number of the event
signals read out from the pixel region, and when the
number of the counted event signals exceeds a preset
threshold within a predetermined period, the readout
circuit discards the event signals read out from the pixel
region, and transmits an acknowledge signal to the
pixel region, the readout circuit further comprises an arbiter configured
to arbitrate, when the pixel region generates a plurality
of the event signals in a predetermined period, a
readout order of the event signals from among the
plurality of event signals, and the arbiter further comprises a priority determination unit
configured to hold priority corresponding to a readout
order of the event signals and performs the arbitration
based on the priority.

* * * * *